R. G. LARSON AND W. F. HORTON.
TROLLEY WHEEL.
APPLICATION FILED MAY 26, 1920.

1,367,913.

Patented Feb. 8, 1921.

Inventors
R. G. Larson
W. F. Horton
By their Attorneys
Williamson Merchant

UNITED STATES PATENT OFFICE.

RAYMOND G. LARSON, OF OWATONNA, MINNESOTA, AND WALTER F. HORTON, OF FORT WORTH, TEXAS.

TROLLEY-WHEEL.

1,367,913.  Specification of Letters Patent.  Patented Feb. 8, 1921.

Application filed May 26, 1920. Serial No. 384,407.

*To all whom it may concern:*

Be it known that we, RAYMOND G. LARSON and WALTER F. HORTON, citizens of the United States, residing at Owatonna and Fort Worth, counties of Steele and Tarrant, and States of Minnesota and Texas, respectively, have invented certain new and useful Improvements in Trolley-Wheels; and we do hereby declare the following to be a full, clear, and exact description of the invention, such as will enable others skilled in the art to which it appertains to make and use the same.

Our invention has for its object to provide an improved trolley wheel of the type having an intermediate trolley wire groove and spiral replacing grooves so arranged on opposite sides of the intermediate groove as to automatically return the trolley wire to the intermediate groove in case the same should be accidentally displaced.

To the above end, the invention consists of the novel devices and combinations of devices hereinafter described and defined in the claims.

In the accompanying drawings, which illustrate the invention, like characters indicate like parts throughout the several views.

Referring to the drawings.

Figure 1:
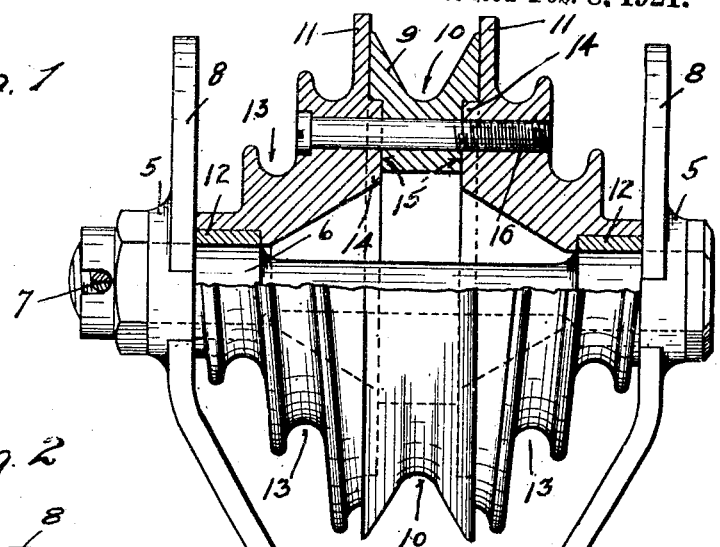
Figure 1 is a view partly in elevation and partly in section.
Figure 2:
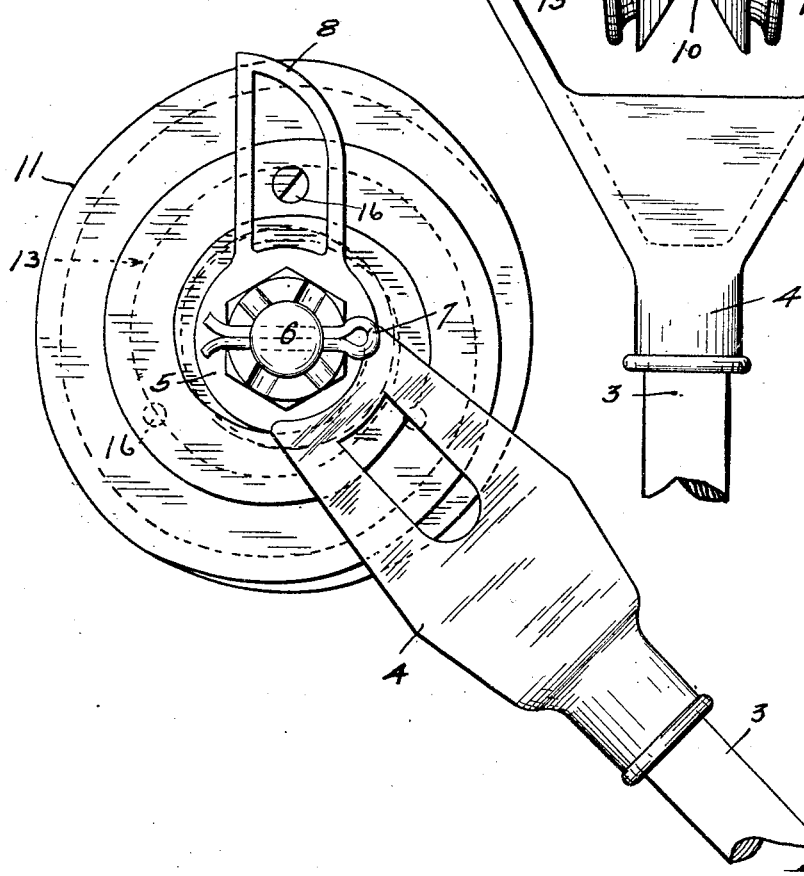
Fig. 2 is a view in side elevation.

The numeral 3 indicates a trolley arm having attached to its outer end a fork or harp 4, on the prongs of which are formed a pair of axially alined hubs 5. A shaft 6, in the form of a nut-equipped bolt, has its ends mounted in the hubs 5 and the nut thereof is locked in position by a cotter pin 7 inserted through a bore in the shaft and any one pair of alined notches in said nut. Integrally formed with each hub 5 is an upwardly projecting guard finger 8.

The trolley wheel proper includes an intermediate ring wheel 9 and two axially alined cones 11 located on opposite sides of said ring wheel and having their bases turned toward each other. Formed in the periphery of the ring wheel 9 is an annular groove 10 adapted to receive a trolley wire, on which said ring wheel runs. Secured in the outer or small end portions of the cones 11 are bushings 12 journaled on the shaft 6. By reference to Fig. 1, it will be noted that the shaft 6, between the bushings 12, is materially reduced in diameter.

Formed in the peripheries of the cones 11 are right and left-hand spiral grooves 13, which progressively decrease in circumference away from the ring wheel 9. Said ring wheel 9 is axially alined with the cones 11 and supported therefrom by forming on the bases of said cones, hub-like extensions 14, which fit in correspondingly formed recesses 15 formed in the sides of the ring wheel. To rigidly but detachably connect the ring wheel 9 and cones 11, there is inserted through alined bores therein a plurality of circumferentially spaced screws 16, the heads of which bear against the outer face of one of said cones and the ends of which have screw-threaded engagement with the other of said cones. It will thus be seen that the ring wheel 9 is frictionally clamped between the cones.

The interiors of the cones 11 are tapered from points near the bushings 12 substantially to the interior surfaces of the ring wheel 9, thus materially reducing the weight of the cones.

From the above description, it is evident that the spiral grooves 13 are so arranged as to return a trolley wire to the groove 10 in case the same becomes displaced from the ring wheel 9. It is also evident that the guard fingers 8 will keep the trolley wire, when displaced from the groove 10, within the prongs of the fork 4. By forming the intermediate portion of the trolley as a ring wheel and supporting the same from the cones, the same may be made relatively light and when worn out, may be replaced with a new one. Substantially, the only wear that comes on the cones 11 is on the bushings 12 and these may be replaced when worn.

What we claim is:

1. The combination with a fork, of a shaft carried thereby and extending therethrough, a pair of axially alined truncated cones journaled on the shaft with their bases turned toward each other, said cones being provided with peripheral right and left hand spiral ribs forming grooves therebetween, said ribs progressively decreasing in circumference away from the bases and a ring wheel having parallel flanges forming an intermediate groove interposed between the cones and carried thereby, the flanges on said wheel being distinct from the flanges on the cones.

2. The combination with a fork, of a shaft carried thereby and extending therethrough, a pair of axially alined truncated cones journaled on the shaft with their bases disposed toward each other, said cones being provided, respectively, with peripheral right and left hand helical ribs forming grooves therebetween, said grooves being appreciably wider than the flanges, said flanges preferably decreasing in circumference away from said bases, a ring wheel interposed between the cones, said wheel having parallel flanges tapered to form a V-shaped groove therebetween and having parts that interlock with the cones to be supported by the same and means detachably connecting the cones and wheel.

3. The combination with a fork, of a shaft carried thereby and extending therethrough, means at the outer sides of said fork for holding the shaft in position, a pair of axially alined truncated cones with their bases turned toward each other, said cones being provided respectively with peripheral right and left hand helical flanges forming grooves therebetween, said grooves progressively decreasing in circumference away from said bases, said cones being journaled on said shaft, a wheel interposed between the cones having parallel wedge-shaped flanges forming a groove therebetween, said wheel being carried by the cones and having an interlocking shoulder engaged thereby, and means rigidly but detachably connecting the cones and wheel inside of said shoulder.

In testimony whereof we affix our signatures.

RAYMOND G. LARSON.
WALTER F. HORTON.